(No Model.) 2 Sheets—Sheet 2.

G. E. DAVIS.
CAMERA AND ELECTRICAL FLASH LIGHT ATTACHMENT.

No. 421,484. Patented Feb. 18, 1890.

Attest: J. Thomas Totrom, Walter Scott.

Inventor: George E. Davis,
By Paine & Lord, Attys.

UNITED STATES PATENT OFFICE.

GEORGE E. DAVIS, OF DUBUQUE, IOWA.

CAMERA AND ELECTRICAL FLASH-LIGHT ATTACHMENT.

SPECIFICATION forming part of Letters Patent No. 421,484, dated February 18, 1890.

Application filed March 9, 1889. Serial No. 302,647. (No model.)

*To all whom it may concern:*

Be it known that I, GEORGE E. DAVIS, a citizen of the United States, residing at Dubuque, in the county of Dubuque and State of Iowa, have invented certain new and useful Improvements in Cameras and Electrical Flash-Light Attachments therefor; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has for its object the production of an electric burglar-detector camera, whereby a burglar or intruder entering a room, car, or vault where my invention is located will be immediately photographed, the working of the camera and the production of the flash-light being attained simultaneously by electrical connection.

The invention consists, briefly, in a camera having an electrically-controlled shutter and an electrically-controlled flash-light producer.

The invention also comprises the details of construction, combination, and arrangement of parts, substantially as hereinafter fully set forth, and particularly pointed out in the claims.

Figure 1:
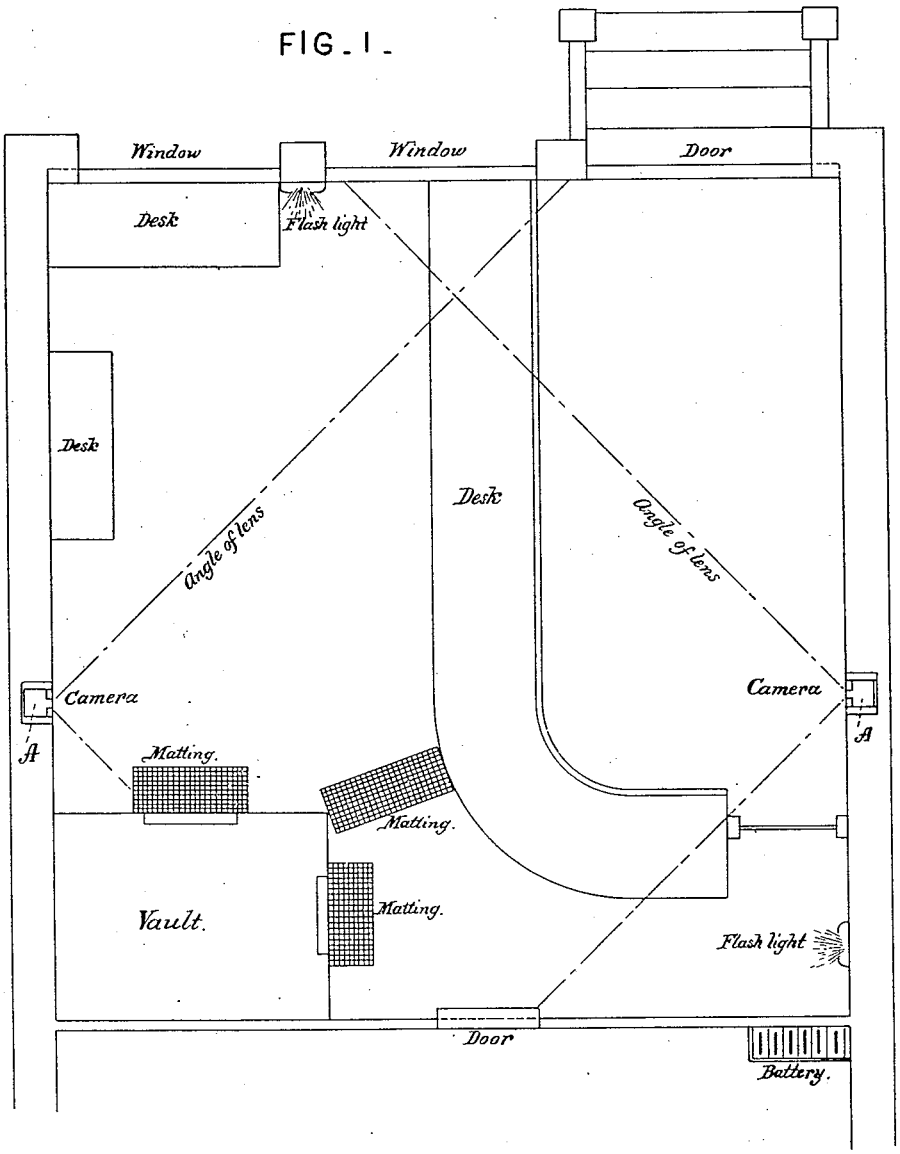
Figure 2:
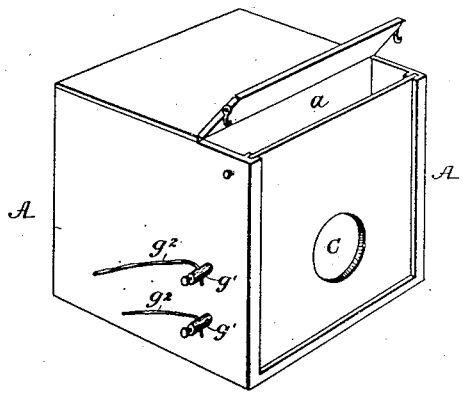
Figure 4:
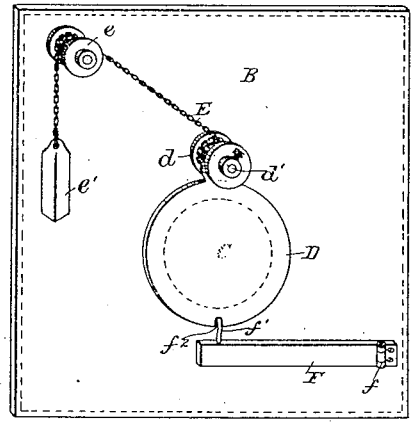
Figure 3:
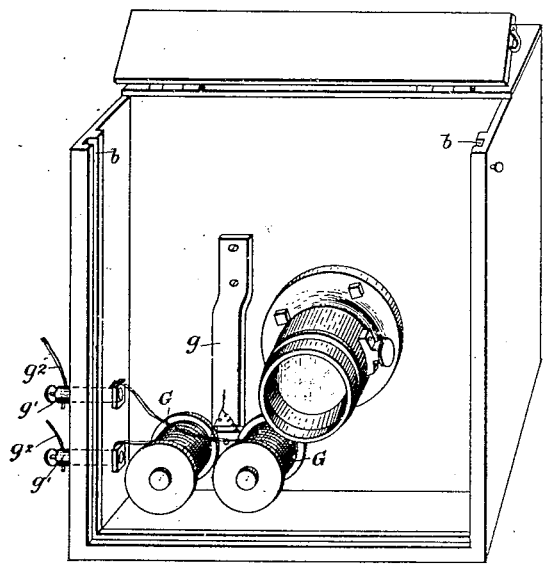
Figure 5:
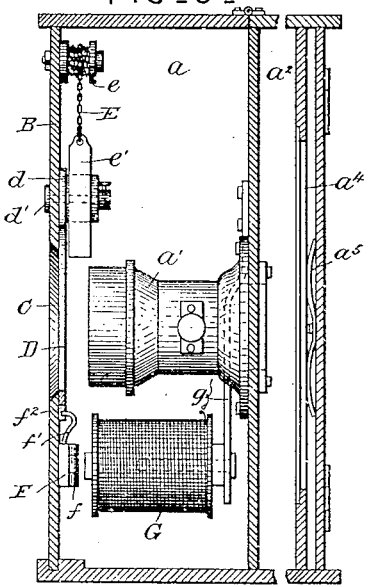
Figure 6:
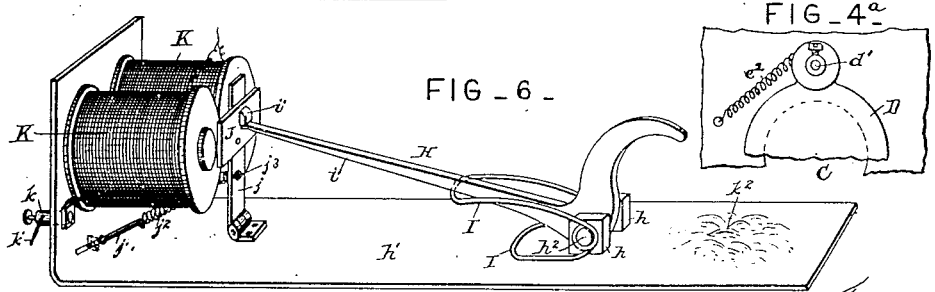

In the accompanying drawings, Figure 1 is a diagrammatical view of a room, showing my invention located therein. Fig. 2 is a view in perspective of the camera. Fig. 3 is a similar view with the front sliding wall or section removed. Fig. 4 is a view of said wall or section. Fig. 4$^a$ is a view of a modification. Fig. 5 is a vertical sectional view with parts broken away. Fig. 6 is a view in perspective of my improved flash-light producer.

Referring to the drawings, A designates the camera; $a$ the front compartment thereof, wherein the lens $a'$ is located, and $a^2$ the rear compartment provided with a hinged door $a^4$, and a spring $a^5$ for retaining therein an ordinary gelatine plate.

B is the front wall of the camera, the same being removably secured in grooves $b$ $b$. In the center of this wall is a circular opening or aperture C, over the rear side of which fits a disk or circular shutter D, provided with an upper extension $d$, fixed rigidly to a pulley or drum projecting from said wall. To this drum is secured one end of a chain or cord E, which, after being wound therearound, is passed over a pulley $e$ at one upper corner of wall B, and to its end is secured a weight $e'$; or in lieu thereof said chain or cord can be connected to a spring $e^2$, as shown in Fig. 4$^a$.

F is a swinging bar or arm pivoted at $f$ to wall B, and at its outer end it has a slightly-bent hook or lug $f'$, designed to enter a lower groove or notch $f^2$ of a shutter D, and thereby hold the same over the opening C.

Two magnets G G are secured within the camera-box, adjacent the lens, the same being attached to a bar $g$, secured to the central partition of said box. The magnets receive the electric current from binding-posts $g'$ $g'$, to which wires $g^2$ $g^2$ are connected. The office of these magnets is that when the electrical circuit is closed they will attract bar or arm F, which serves as an armature, thus freeing the lugs $f'$ from contact with the shutter D, which, under the action of the weighted or spring-held chain or cord E, will swing on its pivot, making one complete revolution, during which time the opening C is unobstructed and the lens will be exposed. By this means a photograph or likeness of the intruder is secured, the light for which purpose is obtained by the means I will now proceed to describe.

At some convenient point is located the means for obtaining the flash-light, the same consisting of a trigger H, pivotally secured between two studs or short posts $h$ $h$ of a plate $h'$, and around the pivot $h^2$ is wound a bent or coiled spring I, which bears against the under side of trigger H and on the plate $h'$. The end of the longer arm $i$ of this trigger is normally in contact with a lug $i'$ on an armature-bar J, secured to a vertical bar or post $j$, hinged to plate $h'$. This bar or post is normally held in a vertical position by contact of a lug on armature with the end of trigger H. A spring $j^2$ on a rod $j'$, secured to plate $h'$ at one end, tends to draw away said bar or post, and by a nut or shoulder $j^3$ on said rod $j'$ the spring $j^2$ is set at a tension, almost overcoming or offsetting the function of trigger H against lug $i'$.

K K are two magnets secured to the right angular end of plate $h'$, and they also receive their currents through binding-posts $k\ k$, to which wires $k'\ k'$ are connected.

To obtain the flash-light, an ordinary paper or pecussion cap or cartridge is placed at the point $k^2$ on plate $h'$, and the same is surrounded by a small quantity of gun-cotton, and a sprinkling of magnesium powder is also used. When the circuit is closed, the magnets will attract armature-bar J, freeing the end of trigger H from lug $i$. The action of spring I will cause the trigger to turn on its pivot and its short arm to come in contact with and effect the explosion of the percussion cap or cartridge. By this means a flash-light is secured.

In practice, the wires $g^2 g^2$ and $k'\ k'$, which are in the same circuit, are connected with some suitable contrivance, such as an electric matting located at a door or window, whereby the stepping of an intruder upon the mat will immediately complete the circuit, causing the armature J to be attracted by magnets K K, thus freeing the trigger and through the operation of spring I effecting the explosion of the cap or cartridge and powder, producing a flash-light. Simultaneous therewith the magnets G G attract the bar F, permitting the shutter to revolve on its pivot, and thus allow the entrance of the flash-light, resulting in the production of a picture or likeness of the intruder on the plate in the camera.

It will be seen that my invention is extremely simple, comprising as it does but few parts, and that as soon as the electric circuit is closed the lens of the camera is exposed and the flash-light is obtained, resulting in the production of a likeness of the intruder.

The invention has been specially described in connection with its use for photographing burglars, as that is the field for which it is specially designed; but it may be usefully employed for other purposes, for flash photography in galleries and in dark and poorly lighted places; and it is to be distinctly understood that the use of the apparatus for any and all purposes for which it is adapted is within the scope of my invention and of this patent.

I claim as my invention—

1. The herein-described improved electric detector, comprising the camera, the electrically-controlled exposure, the flash-light producer, and the electric connections, substantially as set forth.

2. As an improvement in burglar-detectors, the camera having the electrically-controlled shutter, the flash-light producer, and the electric connections, as set forth.

3. The herein-described improved electric detector, comprising the camera having a shutter and magnets, and the electrically-operated flash-light trigger, substantially as set forth.

4. The herein-described improved electric burglar-detector, comprising the camera having a shutter, the armature-bar engaging said shutter, the magnets, the flash-light producer, and the electric connection, substantially as set forth.

5. The herein-described improved electric burglar-detector, comprising the camera having the circular opening, the pivoted shutter, the weighted or spring-held cord for operating the same, the armature-bar, the magnets, and the electric connection, substantially as set forth.

6. The herein described improved electric burglar-detector, comprising the camera having an opening, the short stud, the shutter secured to said stud, the chain or cord also secured thereto and having a weight or spring at its outer end, the hinged armature or bar provided with a lug engaging a groove or notch of said shutter, the magnets, and the electric connection, substantially as set forth.

7. The combination, with the camera having the electrically-controlled shutter, of the trigger, the armature for holding the same, and the magnets, substantially as set forth.

8. The combination, with the camera having the electrically-controlled shutter, of the flash-light producer comprising the plate, the spring-pressed trigger, the vertical bar or post, the armature, the magnets, and the electric connection, substantially as set forth.

In testimony whereof I affix my signature in presence of two witnesses.

GEO. E. DAVIS.

Witnesses:
JAMES PLAISTER,
ALEXANDER SIMPTOS.